United States Patent [19]

Imamura et al.

[11] Patent Number: 5,062,680

[45] Date of Patent: Nov. 5, 1991

[54] PLATE PLASTICS OPTICAL WAVEGUIDE

[75] Inventors: Saburo Imamura, Mito; Tatsuo Izawa, Musashino, both of Japan

[73] Assignee: Nippon Telegraph and Telephone Corporation, Tokyo, Japan

[21] Appl. No.: 586,984

[22] Filed: Sep. 24, 1990

[30] Foreign Application Priority Data

Sep. 27, 1989 [JP] Japan .................. 1-249180

[51] Int. Cl.$^5$ .............. G02B 6/00; C08F 14/14; B32B 9/04; G03G 15/04

[52] U.S. Cl. .................. 385/131; 526/291; 428/411.1; 428/429; 430/57; 385/143; 385/145

[58] Field of Search .............. 350/96.11, 96.12, 96.30, 350/96.34; 526/329.7, 291, 292.1, 293, 294; 428/411.1, 429; 430/56, 57, 80

[56] References Cited

U.S. PATENT DOCUMENTS

| | | | |
|---|---|---|---|
| 4,138,194 | 2/1979 | Beasley | 350/96.30 |
| 4,286,838 | 9/1981 | Huignard et al. | 350/96.11 |
| 4,536,450 | 8/1985 | Garito | 428/411.1 |
| 4,572,610 | 2/1986 | Krajewski | 350/96.34 |
| 4,712,854 | 12/1987 | Mikami et al. | 350/96.12 |
| 4,863,236 | 9/1989 | Herbrechtsmeier et al. | 350/96.34 |
| 4,955,977 | 9/1990 | Dao et al. | 350/96.34 |
| 4,966,435 | 10/1990 | Matsumoto et al. | 350/96.34 |

FOREIGN PATENT DOCUMENTS 60-63709  3/1985  Japan ............ 350/96.34 X

*Primary Examiner*—Brian Healy
*Attorney, Agent, or Firm*—Spencer & Frank

[57] ABSTRACT

A plate plastics optical waveguide includes a core portion composed of a polymer containing a deuterium atom or a halogen atom, and a clad portion which surrounds the core portion and is composed of a polymer having a refractive index lower than that of the core portion. A plastics optical waveguide having a core portion comprising a deuterated or halogenated polyacrylate or polysiloxane shows an optical loss of 0.1 dB/cm or less for light having a wavelength of 1.3 μm.

20 Claims, 2 Drawing Sheets

PLATE PLASTICS OPTICAL WAVEGUIDE

BACKGROUND OF THE INVENTION

1. Field of the Invention

The present invention relates to plastics optical waveguides, more particularly to a plate plastics optical waveguide useful as an optical component, such as an optical coupler or multiplexer for optical communication or image transmission.

2. Description of Prior Art

As a base material for optical components or optical fibers, generally inorganic substances, such as silica glass and multicomponent glass, are used because their propagation loss is low and their transmission band is wide.

On the other hand, optical components using plastics as a base material have been developed. Plastics optical materials have good fabrication flexibility and controllability of optical properties compared with inorganic optical materials and, and therefore, much attention has been paid thereto with an expectation that optical waveguides having relatively good characteristics could be produced with ease using them. Representative techniques for producing plate plastics optical waveguides include selective photopolymerization and utilization of a photosensitive resin.

The selective photopolymerization method is a technique within which monomers contained in a polymer are selectively polymerized to change the refractive index to make a pattern-like optical waveguide. More particularly, at first a mask having a predetermined pattern is mounted on a polymer sheet or substrate composed of a transparent polymer such as polycarbonate which contains a low refractive index monomer, such as methyl acrylate, and the sheet or substrate are irradiated with ultraviolet rays through the mask to selectively polymerize the low refractive index monomer in accordance with the pattern. The photopolymerized portion of the polymer has a lower refractive index than the polymer matrix. Then the polymer sheet is heated in vacuum to remove unreacted monomers which remain in areas not exposed to ultraviolet rays. As a result, the unexposed portions of the polymer consist of the high refractive index polymer alone. Thus, a patterned sheet can be obtained in which a high refractive index portion serving as a core is formed in accordance with a predetermined pattern. Finally, the patterned sheet is sandwiched by a clad composed of a low refractive index polymer to produce an objective optical part.

On the other hand, according to the method which uses a photosensitive polymer, a photosensitive polymer is pattern-wise exposed to a light to cause crosslinking selectively, followed by development to remove unexposed portions to obtain a core pattern. More particularly, at first a polymer serving as a clad is coated on a substrate by dipping or spin coating. A polymer, such as polyurethane, containing a photosensitive crosslinking agent is coated on the clad in the same manner as above. Then, the coated polymer is irradiated with ultraviolet rays through a patterened mask to selectively crosslink the polymer. Next, the substrate is immersed in a solvent to remove unexposed portions to obtain a core having a predetermined pattern. Finally, a clad material is provided on the core by dipping, spin coating or laminating to form a clad and, thus, an objective optical part is produced.

In order to obtain practically useful optical parts which show a low optical loss, it is required that a film for transmitting a light is of good quality and patterns formed by microprocessing have a high reliability. That is, it is preferred that the material of the film itself show an optical loss which is as low as possible, and the thickness and refractive index of the film be controlled with high precision. Further, smoothness of side walls of the core, and dimension stability and reproducibility are important factors for the microprocessing of the waveguide fabrication.

In the case where a plastics material is used, optical parts produced by the selective photopolymerization method and the method using a photosensitive polymer, respectively, show a relatively low optical loss at shorter wavelengths (0.48 to 1.1 $\mu$m). However, they show a high optical loss, as high as 0.5 to 10 dB/cm, in the infrared region (1.3 to 1.55 $\mu$m), utilized in optical communication at present, because of higher harmonics of infrared vibrational absorptions due to the carbon-to-hydrogen bonds constituting the plastics, and therefore they are unsuitable for practical use.

From the standpoint of fabrication flexibility of optical waveguides, both methods are simpler and easier than methods employed in the production of glass optical waveguides. However, the selective photopolymerization method has some problems, such as, that the content of the monomer varies depending on the conditions of evaporation of the solvent which causes subtle fluctuation of the refractive index difference. On the other hand, the method using a photosensitive polymer has problem that resolution is poor and that protrusions and depressions tend to occur on the surface of the optical waveguide due to swelling upon development. These are reasons why conventional plastics optical waveguides show high optical losses.

SUMMARY OF THE INVENTION

Under the circumstances, the present invention has been made in order to obviate the above-described defects of conventional plastics optical waveguides.

It is therefore an object of the present invention to provide a plate plastics optical waveguide which shows a low optical loss in the visible to infrared region.

In a first aspect of the present invention, a plate plastics optical waveguide comprises:
- a core portion composed of a polymer containing a deuterium atom or a halogen atom, and
- a clad portion surrounding the core portion and composed of a polymer having a refractive index lower than a refractive index of the core portion.

Here, the core portion may be composed of a deuterated or halogenated polyacrylate having a repeating unit represented by the following formula (I):

wherein each of $X_1$ and $X_2$ is a deuterium atom or a halogen atom; $R_1$ is selected from the group consisting of a deuterium atom, a $CD_3$ group and a halogen atom; and $R_2$ is a halogenated or deuterated alkyl group of formula: $C_nY_{2n-1}$ (where Y is a halogen atom or a deuterium atom; n is one integer of 1 to 5). The core portion may be composed of a copolymer of deuterated or halogenated acrylates, the copolymer may have at least two different repeating units represented by the foregoing formula (I), respectively.

The core portion may be composed of a deuterated or halogenated polysiloxane having a repeating unit represented by the following formula (II) or (III):

(II)

(III)

wherein each of $R_3$ and $R_4$ is a group of formula $C_nY_{2n+1}$ (where Y is a halogen atom or a deuterium atom and n is an integer of 1 to 5) or $C_6Y_5$.

The core portion may be composed of a copolymer of deuterated or halogenated siloxanes, the copolymer may have at least two different repeating units represented by the foregoing formula (II), respectively, or at least two different repeating units represented by the foregoing formula (III), respectively. The core portion may be composed of a copolymer having the foregoing repeated units (II) and (III).

The clad portion may be composed a polymer having a deuterium atom or a halogen atom.

The clad portion may be composed a deuterated or halogenated polyacrylate having a repeating unit represented by the following formula (I):

(I)

wherein each of $X_1$ and $X_2$ is a deuterium atom or a halogen atom; $R_1$ is selected from the group consisting of a heavy hydrogen atom, a $CD_3$ group and a halogen atom; and $R_2$ is a halogenated or deuterated alkyl group of formula: $C_nY_{2n-1}$ (where Y is a halogen atom or a deuterium atom and n is an integer of 1 to 5). The clad portion may be composed of a copolymer of deuterated or halogenated acrylates, and the copolymer may have at least two different repeating units represented by the foregoing formula (I), respectively.

The clad portion may be composed of a deuterated or halogenated polysiloxane having a repeating unit represented by the following formula (II) or (III):

(II)

-continued (III)

wherein each of $R_3$ and $R_4$ is a group of formula $C_nY_{2n+1}$ (where Y is a halogen atom or a heavy hydrogen atom and n is an integer of 1 to 5) or $C_6Y_5$.

The clad portion may be composed of a copolymer of deuterated or halogenated siloxanes, and the copolymer may have at least two different repeating units represented by the foregoing formula (II), respectively, or at least two different repeating units represented by the foregoing formula (III), respectively. The clad portion may be composed of a copolymer having the foregoing repeated units (II) and (III).

In a second aspect of the present invention, a plate plastics optical waveguide comprises:
a substrate,
a lower clad portion made of a first polymer and provided on the substrate;
a core portion made of a homopolymer or copolymer of dueterated or halogenated acrylates or deuterated or halogenated siloxanes provided on the lower clad portion; and
an upper clad portion made of the first polymer, the upper clad portion being provided on the core portion and surrounding the core portion together with the lower clad portion.

Here, the first polymer constituting the lower and upper clad portions may be composed of a homopolymer or copolymer of deuterated or halogenated acrylates or deuterated or halogenated siloxanes.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The most important factor influencing optical loss of plastics is higher harmonics of infrared vibrational absorption due to the carbon-to-hydrogen bonds constituting the plastics. In the plastics optical waveguide of the present invention, the hydrogen atoms in the structure of the plastics are substituted with a halogen atom, such as fluorine, chlorine and iodine, or a deuterium atom in order to reduce the higher harmonics due to the carbon-to-hydrogen bonds and shift them to a longer wavelength region. The substitution enables reduction of optical loss of the material itself and results in optical waveguides produced using the material having a high performance.

Such optical waveguides as described above can be produced by providing a substrate, forming a plastics film on the substrate, further forming a pattern of photoresist on the plastics film by lithography, and dry etching the substrate in an oxygen- or fluorine-containing gas using the patterned photoresist as a mask. More particularly, a photoresist is coated on a sheet of polymer to be processed and irradiated with actinic rays, such as ultraviolet rays, electron beams, and X rays, pattern-wise or image-wise. Next, the polymer sheet is immersed in a solvent to develop it to obtain a pattern. The resulting pattern is used as a mask when the underlying polymer is subjected to reactive dry etching in a fluorine- or oxygen-containing gas in order to transfer the pattern to the polymer sheet.

Figure 1A:
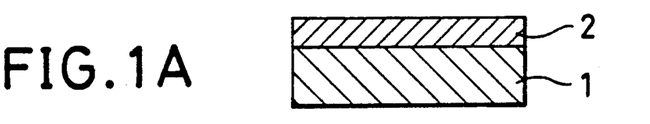
FIGS. 1A to 1G are schematic cross-sectional views of a plastics optical waveguide according to the present invention for illustrating an example of a process for producing same.
Figure 1B:
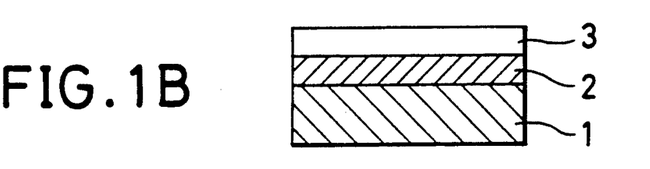
Figure 1C:
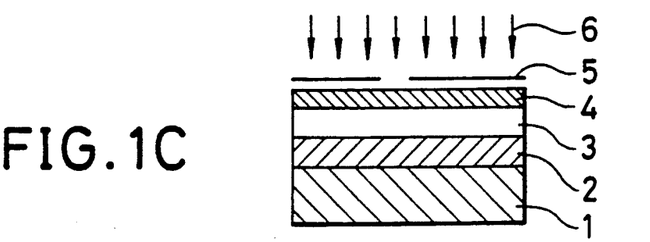
Figure 1D:
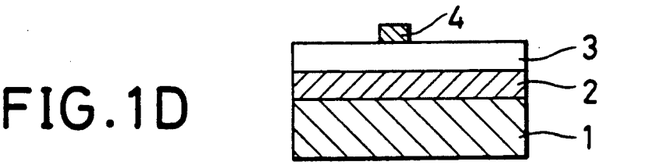
Figure 1E:
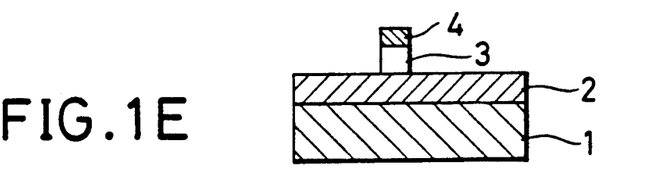
Figure 1F:
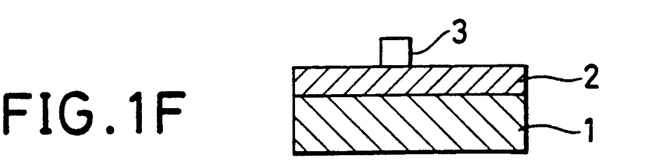
Figure 1G:
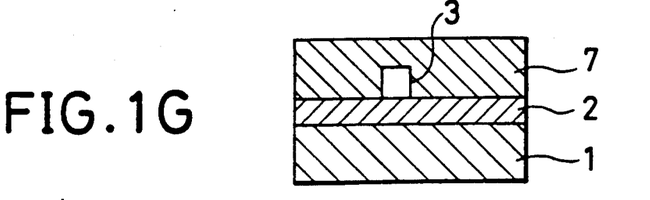

While the plastics optical waveguides of the present invention can be produced by combination of the above-described steps, a representative processing procedure will be explained hereinafter referring to FIGS. 1A through 1G. At first, a clad material is coated on a substrate 1 to form a layer-like clad 2 (FIG. 1A). Then, a core material composed of an organic polymer is coated on the clad 2 to form a core layer 3 (FIG. 1B). Next, as illustrated in FIG. 1C, a silicone-based photoresist 4 is coated on the core layer 3, and exposed to actinic rays through a mask 5, followed by development to obtain a mask pattern (FIG. 1D). Further, reactive ion etching using oxygen gas is carried out to remove the core layer 3 in a region other than the patterned portion (FIG. 1E). The photoresist is peeled off (FIG. 1F), and a clad material 7 which has the same composition as the clad 2 is coated or laminated thereon (FIG. 1G).

This production method is advantageous in that patterns having high resolution and high dimension stability, with steep and smooth side walls, are obtained by the use of reactive ion etching in fewer steps and with excellent reproducibility.

From the viewpoint of mass production, it is also advantageous to use a method in which a plurality of optical waveguides are made on a substrate of a large surface area simultaneously and fabricated by using a stamper or metal mold.

Figure 2:
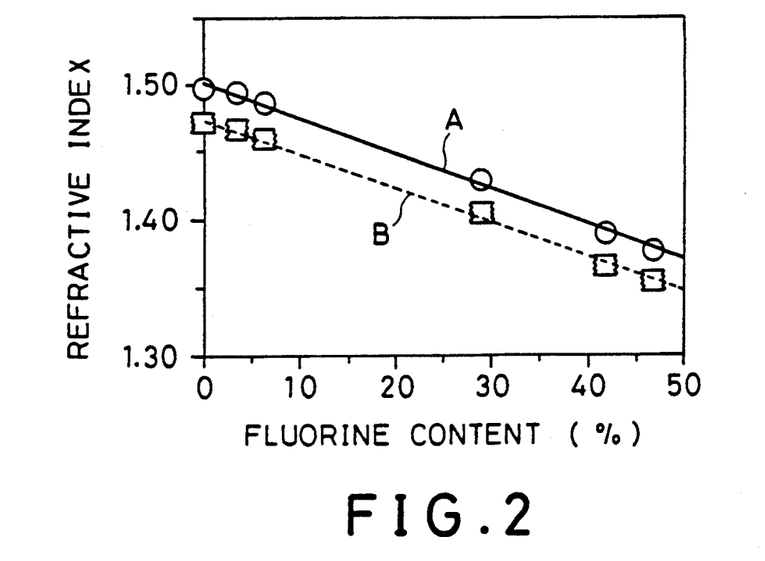
FIG. 2 is a characteristic graph illustrating variation of the refractive index of polyacrylate with the fluorine content thereof.

As is well known, optical waveguides are designed to propagate light in the core utilizing the difference in refractive index between their cores and clads. In the case of plastics optical waveguides, the difference in refractive index can be generated by the use of different types of plastics in the core and clad, respectively. Alternatively, the refractive index of the core and/or clad can be controlled by the content of fluorine in the polymer or polymers. FIG. 2 illustrates variation of the refractive index of a copolymer of a deuterated heptafluoroisopropyl methacrylate with a deuterated methyl methacrylate with the fluorine content in the polymer. In FIG. 2, lines A and B indicate refractive indices for light having and wavelengths of 0.6328 $\mu$m and 1.5230 $\mu$m, respectively. In both cases, the refractive indices decrease linearly with increase of fluorine content.

Now the present invention will be explained with reference to specific embodiments.

EMBODIMENT 1

A monomer mixture composed of 20 mole % of heptafluoroisopropyl methacrylate d-5, which is a monomer whose five hydrogen atoms are each substituted with a deuterium atom, and 80 mole % of perdeuteromethyl methacrylate, which is a monomer all the hydrogen atoms of which were each substituted with a deuterium atom, were polymerized using 2,2'-azobisisobutyronitrile (AIBN) as a polymerization initiator to obtain a copolymer (refractive index: n=1.46). Separately, heptafluoroisopropyl methacrylate d-5 was polymerized using AIBN as a polymerization initiator to obtain a homopolymer (n=1.37).

Then, an optical waveguide was produced using the copolymer as a core material and the homopolymer as a clad material as follows. First, the two polymers were dissolved separately in 1,3-bis(trifluoromethyl)benzene to obtain two solutions, i.e., a core component polymer solution and a clad component polymer solution. The clad component polymer solution was coated to form a layer having a dry thickness of about 10 $\mu$m on a silicon substrate. The coated substrate was heated to 90° C. to dry the coated layer, and then the core component polymer solution was coated on the clad component polymer to have a dry thickness of about 8 $\mu$m.

Next, a silicone-based photoresist was coated on the core component polymer. The thus-coated substrate was exposed to actinic rays and developed to form a resist pattern. Further, reactive ion etching with oxygen gas was performed to remove the core component polymer other than the pattern portion to give a linear, rectangular pattern having a size of 50 mm long, 8 $\mu$m wide and 8 $\mu$m high. The photoresist thus obtained was immersed in an alkali solution to peel off the photoresist. Finally, a clad layer was coated which had the same composition as the underlying clad layer (lower clad layer) to form an upper clad layer. The thickness of the upper clad layer on the core layer was 10 $\mu$m.

Figure 3:
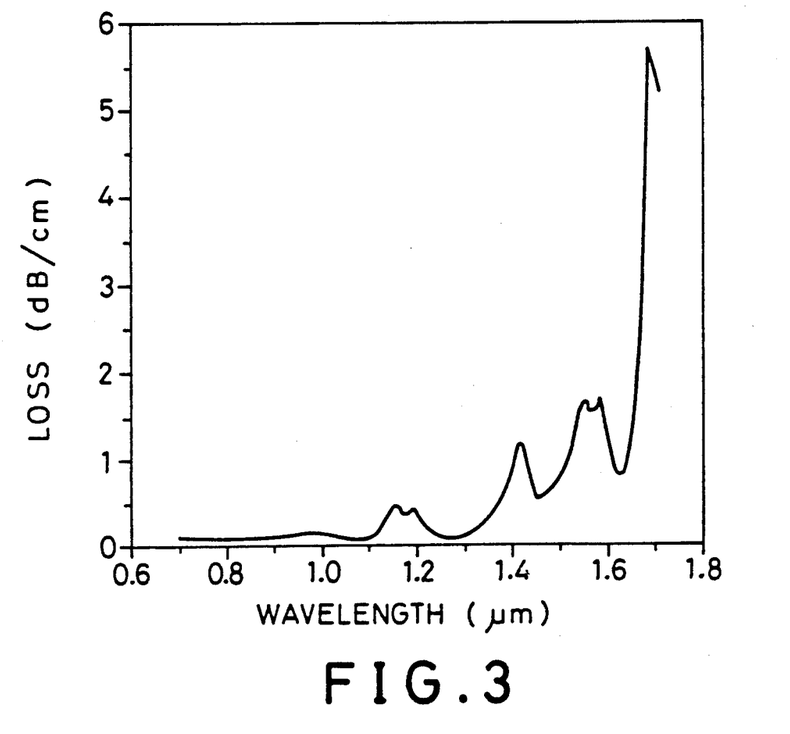
FIG. 3 is a characteristic graph illustrating variation of the optical loss of the plastics optical waveguide according to the present invention with the wavelength.

The optical waveguide thus obtained was irradiated with light at one end thereof and the amount of light launched from the other end was measured. From the results of the measurement the optical loss of the optical waveguide was calculated. FIG. 3 illustrates dependence of the optical loss on the wavelength of light used. The optical loss of the optical waveguide was 0.1 dB/cm or less at a wavelength of 1.3 $\mu$m.

EMBODIMENT 2

An optical waveguide was produced using the same two polymers as used in Example 1 but by a different method. That is, the two polymers were separately dissolved in 1,3-bis(trifluoromethyl)benzene to obtain two polymer solutions, i.e., a clad component polymer solution and a core component polymer solution. The clad component polymer solution was coated on a silicon substrate to form a clad layer having a dry thickness of about 15 $\mu$m. After drying, a silicone photoresist was coated on the clad and exposed to actinic rays and developed. The thus-treated coated substrate was subjected to reactive ion etching with oxygen gas to provide in the clad a groove 8 $\mu$m wide and 6 $\mu$m deep.

Next, the photoresist was peeled off and the core component polymer solution was coated on the etched clad to form a layer having a dry thickness of 10 $\mu$m. Then, back etching was carried out by reactive ion etching with oxygen gas to remove the core component polymer outside the groove. Finally, the same clad component polymer solution as that used for making the first, i.e., lower, clad layer was coated thereon.

By the above-described procedures, an optical waveguide was obtained which had a core with a linear rectangular pattern of 50 mm long, 8 μm wide and 6 μm high. A light with a wavelength of 1.3 μm was inputted from one end of the optical waveguide and amount of light launched from the other end was measured and the optical loss of the optical waveguide was calculated based on the results of the measurement. The optical waveguide had an optical loss of 0.1 dB/cm or less.

EMBODIMENT 3

A polyphenylsilsesquioxane (n=1.56) was prepared by hydrolyzing phenyltrichlorosilane d-5, which is a monomer whose five hydrogen atoms are each substituted with a deuterium atom, dissolving the resulting hydroxyl compound in toluene, adding potassium deuteroxide, KOD, and refluxing the mixture. This polymer was used as a core component polymer. Separately, a polymethylsilsesquioxane (n=1.48) was prepared by the same procedures as above using methyltrichlorosilane d-3, which is a monomer whose three hydrogen atoms are each substituted with a deuterium atom. Then, an optical waveguide was produced using the two polymers as a core material and a clad material, respectively, by the following method.

That is, the two polymers were separately dissolved in methyl isobutyl ketone to obtain two solutions, i.e., a clad component polymer solution and a core component polymer solution. The clad component polymer solution was coated on a silicon substrate to form a clad layer having a dry thickness of about 10 μm. After drying, the core component polymer solution was coated on the clad component polymer to a layer having a dry thickness of about 8 μm. Then, a thick silicone-based photoresist was coated on the core component polymer to form a pattern. Reactive ion etching with a mixed gas composed of $CF_4+H_2$ was performed using the photoresist as a mask to process the core portion and provide a linear rectangular pattern having a size of 50 mm long, 8 μm wide and 8 μm high. After peeling off the photoresist, the same clad component polymer solution as that of the first, i.e., lower, clad was coated on the core portion.

Light with wavelengths of 1.3 μm and 1.5 μm, respectively, was inputted from one end of the optical waveguide and the amount of light launched from the other end was measured and the optical losses of the optical waveguide for respective wavelengths were calculated based on the results of the measurement. The optical waveguide had an optical loss of 0.1 dB/cm or less for each wavelength, which proves that it can be used for the production of various optical circuits satisfactorily.

EMBODIMENT 4

A polyphenylsilsesquioxane (n=1.56) was prepared by hydrolyzing phenyltrichlorosilane d-5, dissolving the resulting hydroxyl compound in toluene, adding KOD, and refluxing the mixture. Separately, a polymethylsilsesquioxane (n=1.48) was prepared by the same procedures as above using methyltrichlorosilane d-3. This polymer was used as a clad component. Then, an optical waveguide was produced using the polyphenylsilsesquioxane as a core component polymer and the polymethylsilsesquioxane as a clad component polymer.

That is, the two polymers were separately dissolved in methyl isobutyl ketone to obtain two solutions, i.e., a clad component polymer solution and a core component polymer solution. The clad component polymer solution was coated on a silicon substrate to form a clad layer having a dry thickness of about 10 μm. After drying, a fluorine-containing polymer was coated on the clad component polymer to form a layer having a dry thickness of about 9 μm. Then, a silicone-based photoresist was coated on the fluorine-containing polymer to form a pattern. Reactive ion etching with a mixed gas composed of $CF_4+H_2$ was performed using the photoresist as a mask to process the clad portion to provide a linear rectangular depth pattern of a size having 50 mm long, 8 μm wide and 9 μm depth. After peeling off the photoresist, the core component polymer solution was poured in the groove formed in the etched clad portion. After drying, the fluorine-containing polymer was removed by dissolving with a solvent to obtain a core pattern. After peeling off the photoresist, the same clad component polymer solution as that of the first, i.e., lower, clad was coated on the core portion.

Light with wavelengths of 1.3 μm and 1.5 μm, respectively, was inputted from one end of the optical waveguide thus produced, and the amount of light launched from the other end was measured and the optical losses of the optical waveguide for respective wavelengths were calculated based on the results of the measurement. The optical waveguide had an optical loss of 0.1 dB/cm or less for each wavelength.

EMBODIMENT 5

A polyphenylsilsesquioxane (n=1.58) was prepared by hydrolyzing 20 parts by weight of phenyltrichlorosilane d-5 and 5 parts by weight of diphenyldichlorosilane d-10, dissolving the resulting hydroxyl compound in toluene, adding KOD, and refluxing the mixture. Separately, a polymethylsilsesquioxane (n=1.48) was prepared by the same procedures as above using methyltrichlorosilane d-3. Then, an optical waveguide was produced using the polyphenylsilsesquioxane as a core component polymer and the polymethylsilsesquioxane as a clad component polymer.

That is, the two polymers were separately dissolved in methyl isobutyl ketone to obtain two solutions, i.e., a clad component polymer solution and a core component polymer solution. At first the clad component polymer solution was coated on a silicon substrate to form a clad layer having a dry thickness of about 10 μm. After drying, the core component polymer was coated on the clad component polymer to form a layer having a dry thickness of about 8 μm. Then a thick photoresist layer was formed on the core component polymer to form a pattern. Reactive ion etching with a mixed gas composed of $CF_4+H_2$ was performed using the photoresist as a mask to process the core portion to provide a linear rectangular pattern having a size of 50 mm long, 8 μm wide and 8 μm high. After peeling off the photoresist, the same clad component polymer solution as that of the first, i.e., lower, clad was coated on the core portion.

Light with wavelengths of 1.3 μm and 1.5 μm, respectively, was inputted from one end of the optical waveguide thus produced, and the amount of light launched from the other end was measured and the optical losses of the optical waveguide for respective wavelengths were calculated based on the results of the measurement. The optical waveguide had an optical loss of 0.1 dB/cm or less for each wavelength.

EMBODIMENT 6

Various plastics optical waveguides were produced in the same manner as in Example 1 or 2 using, as a core and a clad, polyacrylates having a repeating unit represented by the following formula (I) but having different compositions as shown in Table 1:

wherein each of $X_1$ and $X_2$ is a deuterium atom or a halogen atom; $R_1$ is selected from the group consisting of a deuterium atom, a $CD_3$ group, and a halogen atom; and $R_2$ is a halogenated or dueterated alkyl group of formula: $C_nY_{2n-1}$ (where Y is a halogen atom or a deuterium atom and; n is one integer of 1 to 5).

Table 1 shows chemical structures of the polymers used as cores and clads of the optical waveguides and their optical losses for light having a wavelength of 1.5 μm. The optical loss of each optical waveguide was very low, i.e., as low as from 0.04 to 0.11 dB/cm.

TABLE 1

| Structure of Optical Waveguide | Chemical Structure of Polymer | | | | Optical Loss (dB/cm) |
|---|---|---|---|---|---|
| | $X_1$ | $X_2$ | $R_1$ | $R_2$ | |
| Clad | D | D | $CD_3$ | $(CF_3)_2CF$ | 0.1 |
| Core | D | D | $CD_3$ | $(CF_2Cl)_2CF$ | |
| Clad | D | D | $CD_3$ | $(CF_3)_2CF$ | 0.09 |
| Core | D | D | $CD_3$ | $(CF_3)(CF_2Cl)CF$ | |
| Clad | D | D | F | $(CF_3)_2CF$ | 0.06 |
| Core | D | D | D | $(CF_3)_2CF$ | |
| Clad | F | F | F | $(CF_3)_2CF$ | 0.04 |
| Core | D | D | F | $(CF_3)_2CF$ | |
| Clad | D | D | $CD_3$ | $(CF_3)_2CF$ | 0.11 |
| Core | D | D | $CD_3$ | $(CF_3)_2CD$ | |
| Clad | D | D | $CD_3$ | $(CD_3)_2CF$ | 0.05 |
| Core | D | D | $CD_3$ | $CD_2CF_3$ | |
| Clad | D | D | $CD_3$ | $CF_3(CF_2)_3CD_2$ | 0.09 |
| Core | D | D | $CD_3$ | $(CF_3)_2CF$ | |

EMBODIMENT 7

Various plastics optical waveguides were produced in the same manner as in Examples 3 to 5 using, as a core and a clad, a linear polysiloxane having a repeating unit represented by the following formula (II) and/or a ladder type polysiloxane having a repeating unit represented by the following formula (III) below but having different compositions as shown in Table 2:

wherein $R_3$ and $R_4$ is a group of formula $C_nY_{2n+1}$ (where Y is a halogen atom or a deuterium atom and n is one integer of/to 5) or $C_6Y_5$.

Table 2 shows chemical structures of the polymers used as cores and clads of the optical waveguides and their optical losses for light having a wavelength of 1.5 μm. In Table 2, symbols II and III in the column of "Structure of Main Chain" correspond to the formulae (II) and (III), respectively. The optical loss of each optical waveguide was very low, i.e., as low as from 0.05 to 0.11 dB/cm.

TABLE 2

| Structure of Optical Waveguide | Chemical Structure of Polymer | | | Optical Loss (dB/cm) |
|---|---|---|---|---|
| | Structure of Main Chain | $R_1$ | $R_2$ | |
| Clad | III | $CD_3$ | $CD_3$ | 0.06 |
| Core | III | $C_6D_5$ | $CD_3$ | |
| Clad | III | $CD_3$ | $CD_3$ | 0.08 |
| Core | III | $C_6D_4Cl$ | $C_6D_4Cl$ | |
| Clad | II | $C_6D_5$ | $CD_3$ | 0.09 |
| Core | II | $C_6D_5$ | $C_6D_5$ | |
| Clad | II | $CD_3$ | $CD_3$ | 0.08 |
| Core | II | $C_6D_5$ | $C_6D_5$ | |
| Clad | II | $CD_3$ | $C_5D_{11}$ | 0.11 |
| Core | III | $C_6D_5$ | $C_6D_5$ | |
| Clad | II | $CD_3$ | $C_5D_{11}$ | 0.10 |
| Core | II | $C_6D_5$ | $C_6D_5$ | |
| Clad | III | $CD_3$ | $C_5D_{11}$ | 0.10 |
| Core | III | $C_6D_5$ | $C_6D_5$ | |
| Clad | II | $C_6D_5$ | $C_6D_5$ | 0.05 |
| Core | II | $C_6D_4Cl$ | $C_6D_4Cl$ | |

EMBODIMENT 8

A polyphenylsilsesquioxane (n=1.56) was prepared by hydrolyzing phenyltrichlorosilane d-5, dissolving the resulting hydroxyl compound in toluene, adding KOH, and refluxing the mixture. Separately, the same copolymer (n=1.46) composed of heptafluoroisopropyl methacrylate d-5 and methyl methacrylate d-8 (blending ratio: 20/80 by mole) as obtained in Example 1 was provided. Then, an optical waveguide was produced using the polyphenylsilsesquioxane as a core component polymer and the copolymer as a clad component polymer.

That is, the two polymers were separately dissolved in methyl isobutyl ketone to obtain two solutions, i.e., a clad component polymer solution and a core component polymer solution. At first the clad component polymer solution was coated on a silicon substrate to form a clad layer having a dry thickness of about 10 μm. After drying, the core component polymer was coated on the clad component polymer to form a layer having a dry thickness of about 8 μm. Then a thick photoresist layer was formed on the core component polymer to form a pattern. Reactive ion etching with a mixed gas composed of $CF_4+H_2$ was performed using the photoresist as a mask to process the core provide a linear rectangular pattern having a size of 50 mm long, 8 μm wide and 8 μm high. After peeling off the photoresist, the same clad component polymer solution as that of the first, i.e., lower, clad was coated on the core portion.

Light with wavelengths of 1.3 μm and 1.5 μm, respectively, was inputted from one end of the optical waveguide thus produced, and the amount of light launched from the other end was measured and the optical losses of the optical waveguide for respective wavelengths were calculated based on the results of the measurement. The optical waveguide had an optical loss of 0.1 dB/cm or less for each wavelength.

EMBODIMENT 9

A polyphenylsilsesquioxane (n=1.56) was prepared by hydrolyzing phenyltrichlorosilane d-5, dissolving the resulting hydroxyl compound in toluene, adding KOH, and refluxing the mixture. Separately, a polymethylsilsesquioxane (n=1.48) was prepared in the same manner as above from methyltrichlorosilane which was not substituted with a deuterium atom. Then, an optical waveguide was produced using the polyphenylsilsesquioxane as a core component polymer and the unsubstituted polymer as a clad component polymer.

That is, the two polymers were separately dissolved in methyl isobutyl ketone to obtain two solutions, i.e., a clad component polymer solution and a core component polymer solution. First, the clad component polymer solution was coated on a silicon substrate to form a clad layer having a dry thickness of about 10 μm. After drying, the core component polymer was coated on the clad component polymer to form a layer having a dry thickness of about 8 μm. Then a thick photoresist layer was formed on the core component polymer to form a pattern. Reactive ion etching with a mixed gas composed of $CF_4+H_2$ was performed using the photoresist as a mask to process the core portion to provide a linear rectangular pattern having a size of 50 mm long, 8 μm wide and 8 μm high. After peeling off the photoresist, the same clad component polymer solution as that of the first, i.e., lower, clad was coated on the core portion.

Light with wavelengths of 1.3 μm and 1.5 μm, respectively, was inputted from one end of the optical waveguide thus produced, and the amount of light launched from the other end was measured and the optical losses of the optical waveguide for respective wavelengths were calculated based on the results of the measurement. The optical waveguide had an optical loss of 0.1 dB/cm or less for each wavelength.

EMBODIMENT 10

Plate plastics optical waveguides each including a clad portion composed of a polyacrylate having a repeating unit represented by the foregoing formula (I) and a core portion composed of a deuterated or halogenated polystryrene resin having a repeating unit represented by $$\begin{array}{c} CD_2-CD-, \\ | \\ C_6Y_5 \end{array}$$

wherein Y is a halogen atom or deuterium, or polysiloxane having a repeated unit represented by the foregoing general formula (III).

Table 3 shows chemical structures of the polymers used as cores and clads of the optical waveguides and their optical losses for light having a wavelength of 1.3 μm. The optical loss of each optical waveguide was very low, i.e., as low as from 0.08 to 0.09 dB/cm.

TABLE 3

| Structure of Optical Waveguide | Chemical Structure of Polymer | Optical Loss (dB/cm) |
|---|---|---|
| Clad | $\begin{array}{c}-CD_2-CD-\\|\\COOCF(CF_3)_2\end{array}$ | 0.09 |
| Core | $\begin{array}{c}-CD_2-CD-\\|\\C_6D_5\end{array}$ | |
| Clad | $\begin{array}{c}-CD_2-CD-\\|\\COOCF(CF_3)_2\end{array}$ | 0.08 |
| Core | $\begin{array}{c}-CD_2-CD-\\|\\C_6F_5\end{array}$ | |
| Clad | $\begin{array}{c}-CD_2-CD-\\|\\COOCF(CF_3)_2\end{array}$ | 0.08 |
| Core | $\begin{array}{c}C_6D_5\\|\\-Si-O-\\|\\O\\|\\-Si-O-\\|\\C_6D_5\end{array}$ | |

Copolymers, which have at least two different repeating units each represented by the foregoing formula (I), of deuterated or halogenated acrylates can be used as a material for the core portion and the clad portion. And further, copolymers, having at least two different repeating units each represented by the foregoing formulae (II) and/or (III), of deuterated or halogenated siloxanes can be used as a material for the core portion and the clad portion.

As described above the plate plastics optical waveguide of the present invention has superior light transmission characteristics in the visible to near infrared region compared to conventional ones.

Particularly, because it shows a low optical loss in a wavelength region of from 650 to 1,600 nm, the plate plastics optical waveguide of the present invention can be connected to multicomponent glass or silica optical fiber without resorting to light/electricity conversion or electricity/light conversion. Therefore, it has the advantage that optical parts produced by using the optical waveguide of the present invention can be used for constructing highly economical optical signal transmission systems such a local area networks and the like.

The invention has been described in detail with respect to embodiments, and it will now be apparent from the foregoing to those skilled in the art that changes and modifications may be made without departing from the invention in its broader aspects, and it is the invention, therefore, in the appended claims which is intended to cover all such changes and modifications as fall within the true spirit of the invention.

What is claimed is:

1. A plate plastics optical waveguide, comprising:
   a substrate;
   a lower clad portion made of a first polymer and provided on said substrate;
   a core portion made of a homopolymer or copolymer of dueterated or halogenated acrylates or deuterated or halogenated siloxanes provided on said lower clad portion; and an upper clad portion made of said first polymer, said upper clad portion being provided on said core portion and surrounding said core portion together with said lower clad portion.

2. The plate plastics optical waveguide as claimed in claim 1, wherein said first polymer constituting said lower and upper clad portions is composed of a homopolymer or copolymer of deuterated or halogenated acrylates or deuterated or halogenated siloxanes.

3. A plate plastics optical waveguide, comprising:
a core portion composed of a deuterated or halogenated polyacrylate having a refractive index and having at least one kind of repeating unit represented by formula (I):

wherein each of $X_1$ and $X_2$ is a deuterium atom or a halogen atom; $R_1$ is selected from the group consisting of a deuterium atom, a $CD_3$ group, and a halogen atom; and $R_2$ is a halogenated or deuterated alkyl group of formula $C_nY_{2n-1}$ in which Y is a halogen atom or a deuterium atom, and n is an integer of 1 to 5; and a clad portion surrounding the core portion and being composed of a polymer having a refractive index which is lower than the refractive index of the core portion.

4. The plate plastics optical waveguide as claimed in claim 3, wherein the core portion is composed of a homopolymer of deuterated or halogenated acrylate having the repeating unit represented by formula (I).

5. The plate plastics optical waveguide as claimed in claim 3, wherein the core portion is composed of a copolymer of deuterated or halogenated acrylates, the copolymer having at least two different kinds of repeating units represented by formula (I), respectively.

6. The plate plastics optical waveguide as claimed in claim 3, wherein the clad portion is composed of a deuterated or halogenated polyacrylate having at least one kind of repeating unit represented by formula (I):

wherein each of $X_1$ and $X_2$ is a deuterium atom or a halogen atom; $R_1$ is selected from the group consisting of a deuterium atom, a $CD_3$ group and a halogen atom; and $R_2$ is a halogenated or deuterated alkyl group of formula $C_nY_{2n-1}$ in which Y is a halogen atom or a deuterium atom, and n is an integer of 1 to 5.

7. The plate optical waveguide as claimed in claim 6, wherein the clad portion is composed of a homopolymer of the deuterated or halogenated polyacrylate having the repeating unit represented by formula (I).

8. The plate plastics optical waveguide as claimed in claim 6, wherein the clad portion is composed of a copolymer of the deuterated or halogenated polyacrylate, the copolymer having at least two different kinds of repeating units represented by formula (I), respectively.

9. The plate plastics optical waveguide, comprising:
a core portion composed of a deuterated or halogenated polysiloxane having a refractive index and having at least one kind of repeating unit represented by formula (II) or formula (III):

wherein each of $R_3$ and $R_4$ is a group of formula $C_nY_{2n+1}$ in which Y is a halogen atom or a deuterium atom, and n is an integer of 1 to 5, or $C_6Y_5$; and a clad portion surrounding the core portion and being composed of a polymer having a refractive index which is lower than the refractive index of the core portion.

10. The plate plastics optical waveguide as claimed in claim 9, wherein the core portion is composed of a homopolymer of the deuterated or halogenated polysiloxane having the at least one kind of repeating unit represented by formula (II) or formula (III).

11. The plate plastics optical waveguide as claimed in claim 9, wherein the core portion is composed of a copolymer of the deuterated or halogenated polysiloxane, the copolymer having at least two different kinds of repeating units represented by formula (II), respectively, or at least two different kinds of repeating units represented by formula (III), respectively.

12. The plate plastics optical waveguide as claimed in claim 9, wherein the core portion is composed of a copolymer having at least two different kinds of repeating units represented by formula (II) and formula (III).

13. The plate plastics optical waveguide as claimed in claim 9, wherein the clad portion is composed of a deuterated or halogenated polyacrylate having at least one kind of repeating unit represented by formula (I):

wherein each of $X_1$ and $X_2$ is a deuterium atom or a halogen atom; $R_1$ is selected from the group consisting of a deuterium atom, a $CD_3$ group and a halogen atom; and $R_2$ is a halogenated or deuterated alkyl group of formula $C_nY_{2n-1}$ in which Y is a halogen atom or a deuterium atom, and n is an integer of 1 to 5.

14. The plate plastics optical waveguide as claimed in claim 13, wherein the clad portion is composed of a homopolymer of the deuterated or halogenated polyacrylate having at least one kind of repeating unit represented by formula (I).

15. The plate plastics optical waveguide as claimed in claim 13, wherein the core portion is composed of a copolymer of the deuterated or halogenated polyacrylate, the copolymer having at least two different kinds of repeating units represented by formula (I), respectively.

16. The plate plastics optical waveguide as claimed in claim 9, wherein the clad portion is composed of a deuterated or halogenated polysiloxane having at least one kind of repeating unit represented by formula (II) or formula (III):

wherein each of $R_3$ and $R_4$ is a group of formula $C_nY_{2n+1}$ in which Y is a halogen atom or a deuterium atom, and n is an integer of 1 to 5, or $C_6Y_5$.

17. The plate plastics optical waveguide as claimed in claim 16, wherein the clad portion is composed of a homopolymer of the dueterated or halogenated polysiloxane having at least one kind of repeating unit represented by formula (II) or formula (III).

18. The plate plastics optical waveguide as claimed in claim 16, wherein the clad portion is composed of a copolymer of the deuterated or halogenated polysiloxane, the copolymer having at least two different kinds of repeating units represented by formula (II), respectively, or at least two different kinds of repeating units represented by formula (III), respectively.

19. The plate plastics optical waveguide as claimed in claim 16, wherein the clad portion is composed of a copolymer having at least two different kinds of repeating units represented by formula (II) and formula (III).

20. A plate plastics optical waveguide comprising:
a core portion composed of a deuterated or halogenated polystyrene having a refractive index; and
a clad portion surrounding the core portion and being composed of deuterated or halogenated polyacrylate having at least on kind of repeating unit represented by formula (I):

wherein each of $X_1$ and $X_2$ is a deuterium atom or a halogen atom; $R_1$ is selected from the group consisting of a deuterium atom, a $CD_3$ group and a halogen atom; and $R_2$ is a halogenated or deuterated alkyl group of formula $C_nY_{2n-1}$ in which Y is a halogen atom or a deuterium atom and n is an integer of 1 to 5.

* * * * *